United States Patent [19]

East

[11] Patent Number: 5,685,415
[45] Date of Patent: Nov. 11, 1997

[54] CONVEYOR BELT STORAGE SYSTEM

[75] Inventor: Charles F. East, Van Vleet, Miss.

[73] Assignee: FMC Corporation, Chicago, Ill.

[21] Appl. No.: 489,015

[22] Filed: Jun. 8, 1995

[51] Int. Cl.$^6$ ................................................. B65G 21/14
[52] U.S. Cl. ................................................. 198/812
[58] Field of Search ........................... 198/812, 861.2

[56] References Cited

U.S. PATENT DOCUMENTS

| 4,245,738 | 1/1981 | Butcher et al. | 198/812 |
| 4,474,287 | 10/1984 | Thompson | 198/812 |
| 4,860,878 | 8/1989 | Mraz et al. | 198/812 X |
| 5,181,600 | 1/1993 | Chappell et al. | 198/812 |
| 5,366,068 | 11/1994 | Hall et al. | 198/812 |

FOREIGN PATENT DOCUMENTS

| 2140369 | 11/1984 | United Kingdom | 198/812 |

OTHER PUBLICATIONS

*Belt Conveyor Systems for Mining and Construction Industries* Contential Conveyor & Equipment Co., Winfield, Alabama (no date).

*H–Plus Series, Belt Conveyor Systems for Mining and Construction Industries*, Continental Conveyor & Equipment Co., Inc., Winfield, Alabama (no date).

*Primary Examiner*—D. Glenn Dayoan
*Attorney, Agent, or Firm*—Michael C. Penn

[57] ABSTRACT

There is provided an idler carriage assembly for use on a conveyor belt storage system having a device for aligning the idler carriage assembly when the idler carriage assembly becomes disengaged from a connecting assembly. The connecting assembly may be an adjacent idler carriage assembly or the pulley carriage assembly. There is also provided a conveyor belt storage system incorporating the idler carriage assembly.

14 Claims, 8 Drawing Sheets

FIG_4

FIG_6

FIG_11

FIG_12

CONVEYOR BELT STORAGE SYSTEM

BACKGROUND OF THE INVENTION

1. Field of the Invention

This invention relates to belt storage systems and more particularly to a mechanical device that facilitates automatic deployment and retention of an idler carriage used on a belt storage unit for operation on a belt conveyor system.

2. Description of Related Art

With the advent of longwall underground mining, belt conveyors have been used to convey large amounts of material out of a mine. The belt conveyors may begin at a maximum length of 5000 feet, for example, and decrease in length daily as material is being mined. Belt storage/take-up systems are desirable to facilitate the continuous decrease in conveyor lengths by absorbing the additional belt as the conveyor shortens.

Figure 1A:
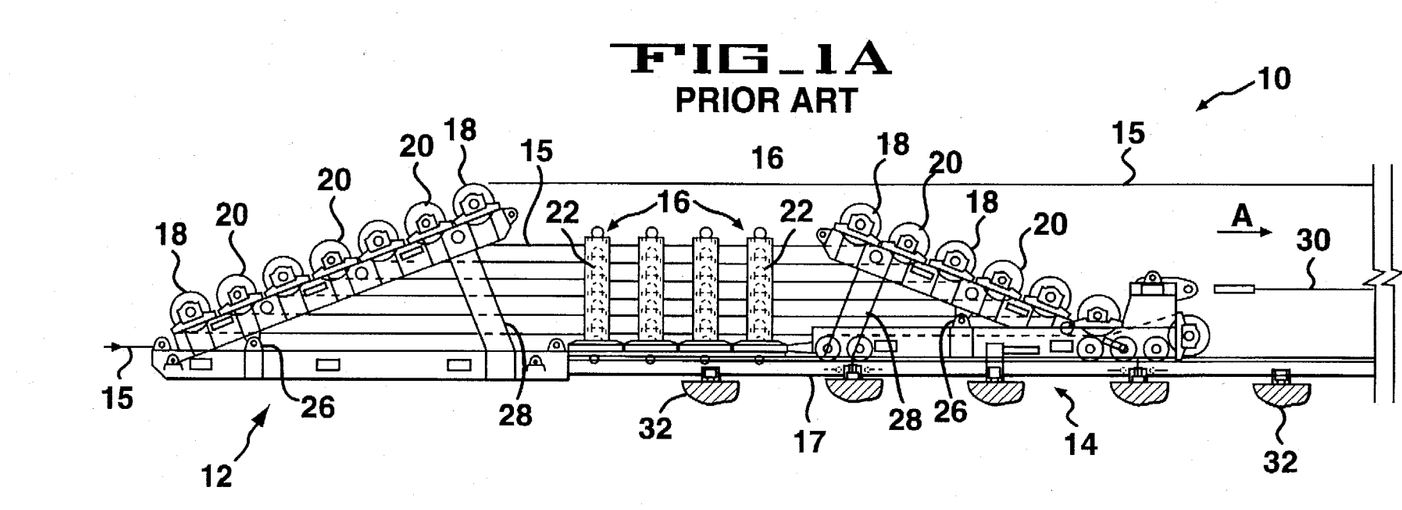
FIG. 1A illustrates an elevation view of a first half of a prior art belt storage unit system.
Figure 1B:
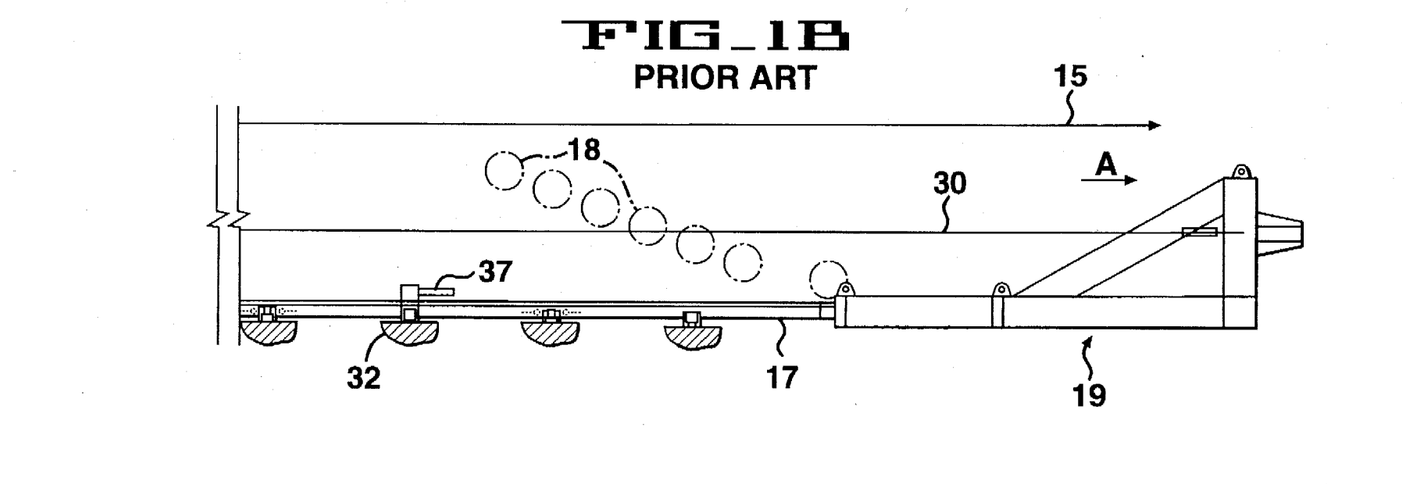
FIG. 1B illustrates an elevation view of the second half of the prior art belt storage unit system and also shows phantom lines representing the end position of the pulleys on the pulley carriage assembly in its final position.

Referring to FIGS. 1A and 1B, prior art conveyor belt storage systems 10, such as FMC Corporation's model number 5080D360-A belt storage unit deployment mechanism, have a fixed frame assembly 12 which may be bolted to the ground, a pulley carriage assembly 14, and a plurality of idler carriage assemblies 16. The idler carriage assemblies 16 serve as intermediate supports to help prevent the sagging of a conveyor belt 15 when the desired length of the conveyor belt is reduced. A sheave frame assembly 19 may be disposed at the end of a track 17 which may act as a stopper to the pulley carriage assembly 14.

Each of the fixed frame assembly 12, the pulley carriage assembly 14, and the idler carriage assemblies 16 is disposed on the track 17. A number of pulleys 18 may be located on each of the fixed frame assembly 12 and the pulley carriage assembly 14. Further, every other pulley 18 may be a snub pulley 20 to help reduce the overall height of the system. Each of the idler carriage assemblies 16 have a plurality of idler rolls 22. The idler rolls 22 are positioned such that they align with the pulleys 18 for carrying the conveyor belt 15.

The fixed frame assembly 12 and the pulley carriage assembly 14 may have a hinge 26 and a strut 28 disposed between the upper base and the lower base of respective assemblies 12 and 14 so that the assemblies may be lowered when placing the mechanism 10, for example, inside a portion of the mine.

Figures 2A, 2B:
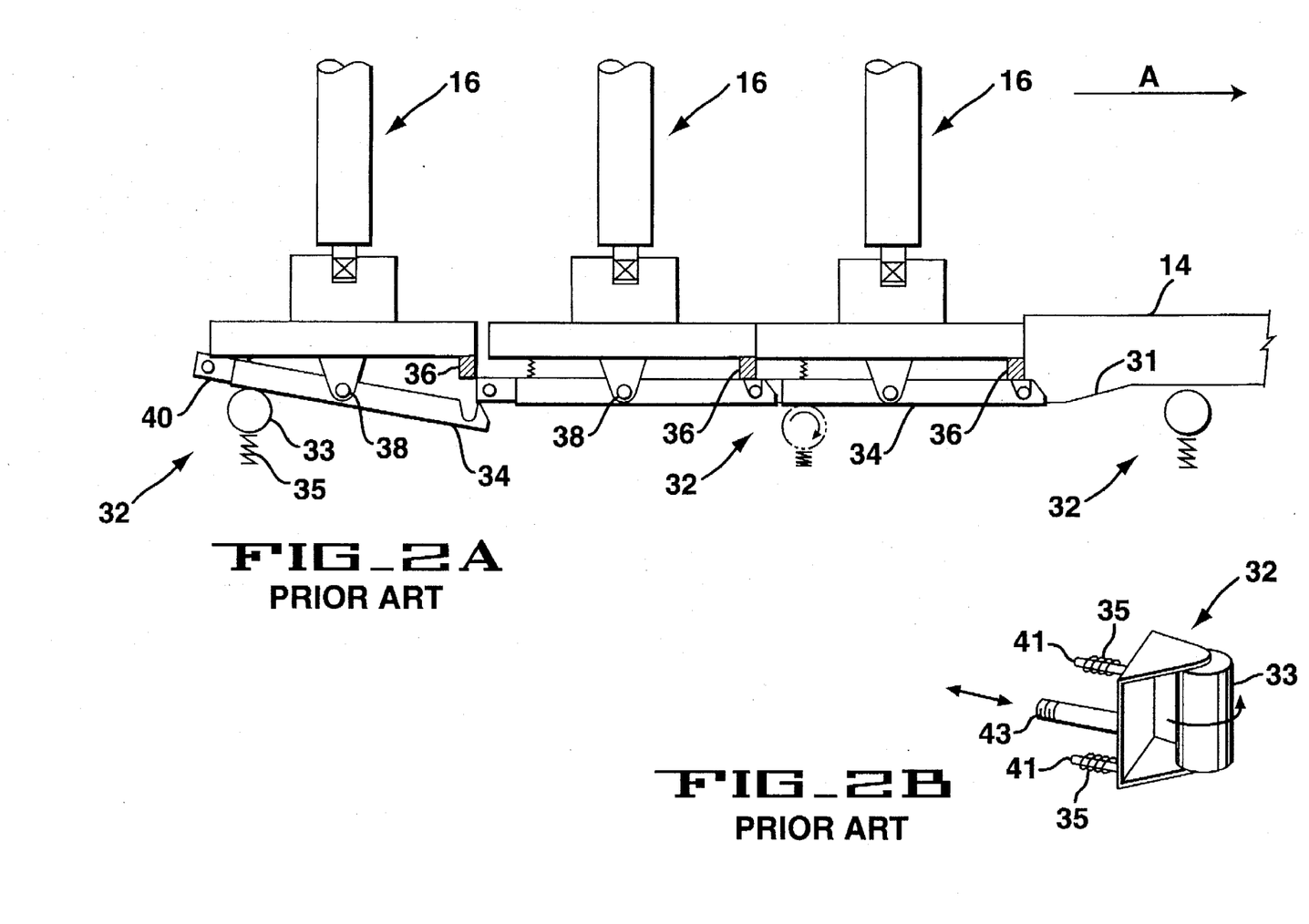
FIG. 2A is a plan view of the cooperation between a prior art pressure roll assembly and idler carriage assembly.
FIG. 2B is a perspective view of the pressure roll assembly.

When it is desired to reduce the length of the conveyor belt 15, a rope 30 may be employed to pull the pulley carriage assembly 14 as well as the connecting idler carriage assemblies 16 along the track 17 in the direction of arrow A. Referring also to FIGS. 2A and 2B, a plurality of pressure roll assemblies 32 containing a pressure roll 33 and a spring 35 may be spaced along the exterior of the track 17. The pressure roll assemblies 32 may be spaced in pairs along each side of the track 17. These pressure roll assemblies 32 serve to disengage a given idler carriage assembly 16 and hold the same in place.

The pressure roll 33 may be a steel roller with anti-friction tapered roller bearings and urethane laggings or coverings. Further, the springs 35 may be disposed around dowel pins 41. The dowel pins help to prevent the pressure roll assembly 32 from rotating and also serve to guide the springs 35. Moreover, a shaft 43 may, for example, apply 400 lbs of force in order to disengage the desired idler carriage assembly 16.

The initial phase of a belt storage unit is in its collapsed stated with all idler carriage assemblies 16 being latched together and connected to the pulley carriage assembly 14.

As the pulley carriage assembly 14 is moved in the direction of arrow A (i.e., the conveyor belt 15 is being stored and tensioned), all idler carriage assemblies 16 move horizontally along with the pulley carriage assembly 14. The now moving unit will pass by and the ramped brackets 31 of the pulley carriage assembly 14 will contact a pressure roll assembly 32. This imparts potential energy via compression springs 35 within the pressure roll assembly 32.

As the idler carriage assemblies 16 continue to move past the rotating pressure roll assembly 32, individual disengagement cannot occur because of a stop block 36 attached to the next oncoming idler carriage assembly 16. That is, a given pressure roll assembly 32 is unable to activate a pivot arm 34 disposed on a given idler carriage assembly 16 because of the presence of the stop block 36. The pivot arm 34 has a bar pin 40 disposed at one end. As seen from FIG. 2A, the pressure roll assembly 32 is capable of disengaging the last idler carriage assembly 16 from the adjacent idler carriage assembly because there is no stop block 36 for preventing the pivot arm from pivoting about pivot pin 38. The pivot arm 34 may thus unlatch from the adjacent bar pin 40. As a result, the next carriage assembly 16 no longer has a stop block 36 to prevent its disengagement. As the carriage travel moves in the direction of arrow A, the next idler carriage assembly 16 may disengage when it comes in contact with the next pair of pressure roll assemblies 32. The last idler carriage assembly 16 to pass by the pressure roll assembly 32 has no more stop blocks to prevent the latch arm movement and therefore the pressure roll 33 converts the potential energy into kinetic energy by pivoting the pivot arm 34. The disengagement of the last idler carriage assembly 16 is complete at this point.

Retention of the disengaged idler carriage assembly 16 is accomplished by an arm 37 attached to the side of the pressure roll assembly 32. The arm 37 extends around the pivot arm 34 to prevent the idler carriage assembly 16 from moving in the direction of the pulley carriage assembly 14.

A plurality of idler carriage assemblies 16, such as eight or more, may be employed every twenty six feet, for example, for reducing the length of the conveyor belt 15. That is, for a system having four pulleys (excluding snub pulleys) on each of the fixed frame assembly 12 and the pulley carriage assembly 14, by moving the pulley carriage assembly 14 one hundred feet (and by disposing the idler carriage assemblies every twenty six feet), the system may be absorbing eight hundred feet of conveyor belt 15. However, prior art idler carriage assemblies may experience deployment and alignment problems. Specifically, a given pair of pressure roll assemblies 32 (i.e., pressure roll assemblies 32 on opposite sides of the track 17) may not always disengage a given idler carriage assembly 16 at the same time. That is, one side of the idler carriage assembly 16 may disengage at four inches past the pivot pin 38 and the other side of the idler carriage assembly 16 may disengage at six inches past the pivot pin, causing alignment problems. If an idler carriage assembly 16 becomes misaligned, the conveyor belt 15 may run crooked (i.e., transverse to the direction of the track 17) and may get into the steel frame of the various components forming the belt conveyor storage system 10. This may damage the conveyor belt 15 or the various components forming the belt conveyor storage system 10, especially the idler carriage assemblies 16.

It is desirable to have a idler carriage deployment mechanism that may allow for automatic deployment of idler carriage assemblies and may allow for proper alignment of the idler carriage assemblies. It is further desirable to have an idler carriage deployment mechanism that may be simple to build, yet may be rugged in construction.

SUMMARY OF THE INVENTION

There is provided an idler carriage assembly for use on a belt storage system comprising means for aligning the idler carriage assembly when the idler carriage assembly becomes disengaged from a connecting assembly. The connecting assembly may be an adjacent idler carriage assembly or the pulley carriage assembly.

There is also provided a belt storage system comprising a fixed frame assembly, a pulley carriage assembly, at least one idler carriage assembly disposed between the fixed frame assembly and the pulley carriage assembly, the fixed frame assembly, the at least one idler carriage assembly and the pulley carriage assembly disposed on a track, the at least one idler carriage assembly having at least one alignment block disposed thereon, at least one pressure roll assembly disposed on the track, wherein the at least one idler carriage assembly becomes disengaged from one of a second idler carriage assembly and the pulley carriage assembly when the at least one pressure roll assembly contacts one end of the at least one alignment block.

There is further provided an idler carriage assembly for use on a belt storage system comprising a stop block mounted to a frame of the idler carriage assembly, a pivot arm rotatably mounted to the frame, the pivot arm being generally parallel with the frame when the said pivot arm is in an unpivoted state, the pivot arm having a notch disposed in a region near the stop block, an alignment block mounted to the frame, the alignment block being flush with a surface of the pivot arm when the pivot arm is in the unpivoted state, a bar pin connected to one end of the pivot arm at an end of the pivot arm which is opposing to the region near the stop block, wherein the pivot arm pivots when a force is applied to one side of the alignment block.

DESCRIPTION OF THE PREFERRED EMBODIMENTS

Figure 3:
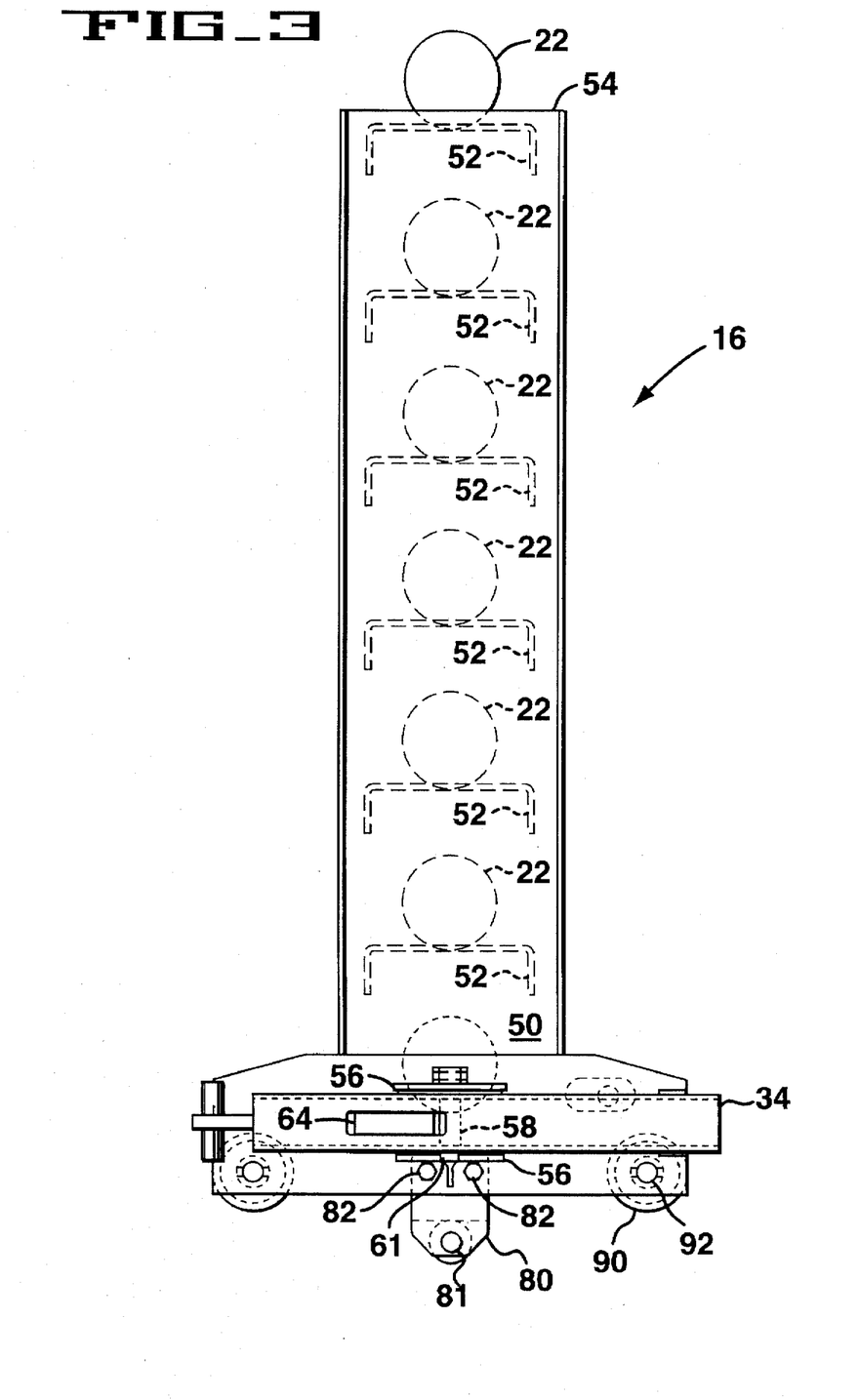
FIG. 3 is an elevation view of an idler carriage assembly of the present invention.

Referring to FIG. 3 there is shown an idler carriage assembly 16 of the present invention. Similar items have been labeled similarly for purposes of clarity. The idler carriage assembly 16 shown in FIG. 3 may be used in conjunction with the belt storage system shown in FIG. 1. The idler carriage asembly 16 contains a plurality of idler rolls 22. Shelves 52 may be used to mount the idler rolls 22 to the idler carriage assembly frame 50.

Figure 4:
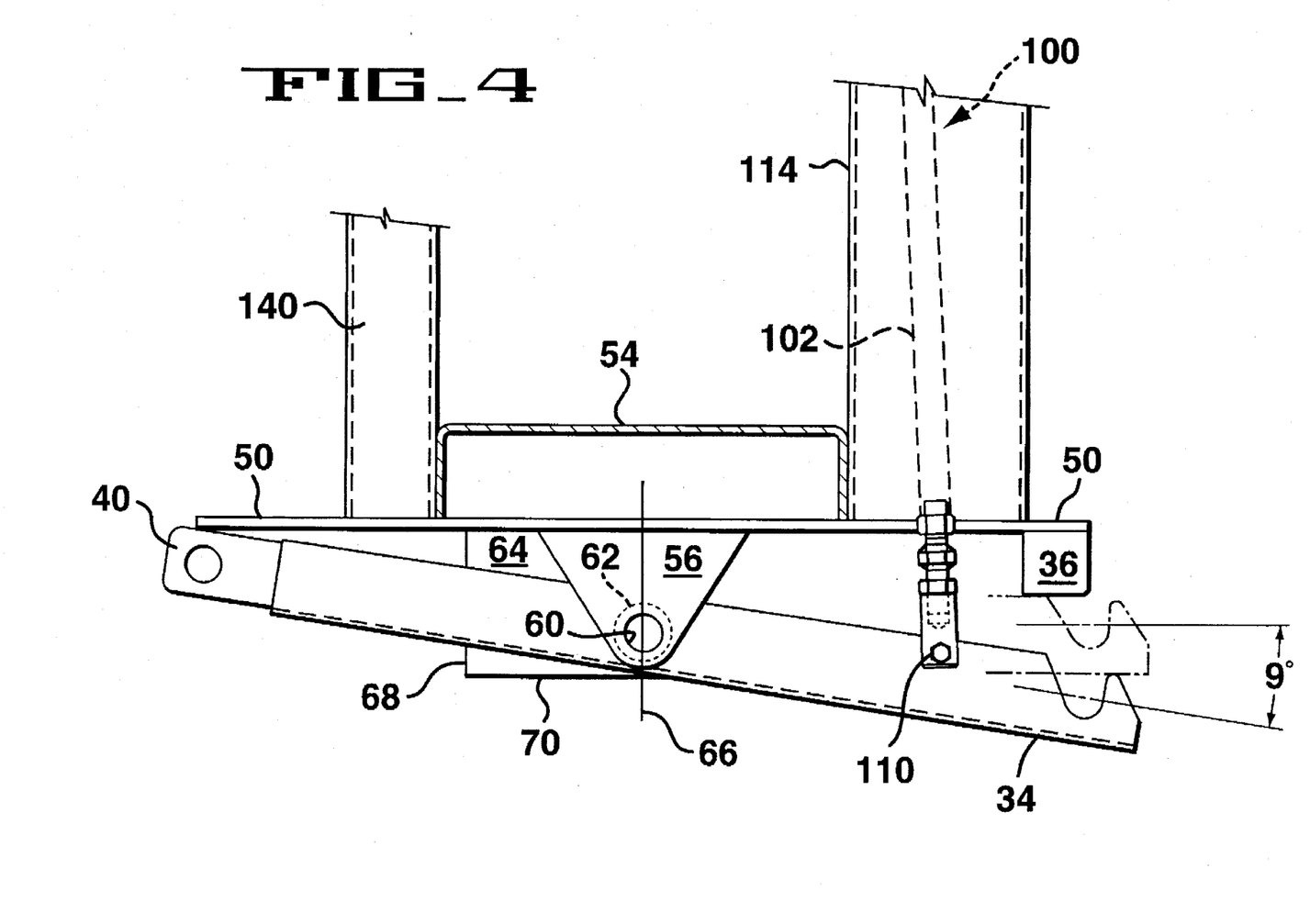
FIG. 4 is a plan view of one end of the idler carriage assembly of the present invention.

Referring also to FIG. 4, the idler carriage assembly frame 50 has an idler carriage weldment 54 disposed at each end. Further, a pair of pivot brackets 56 are also disposed at each end of the idler carriage assembly frame 50. Ribs 58 may be disposed between each pair of pivot brackets 56 to help support the pivot brackets. Each of the pivot brackets 56 contain a bore 60 having a notch 62.

The bore 60 receives a pin 61 allowing the pivot arm 34 to pivot or otherwise be rotatable. Further, a roll pin, not shown, may be used to help prevent pin 61 from rotating or otherwise moving in the longitudinal direction. Further, a grease fitting, not shown, may be provided for lower friction in the movement of pin 61.

An alignment block 64 is preferably welded to the idler carriage assembly frame 50. Preferably, the alignment block 64 begins at one end from a line 66 which represents the line through the center of the bore 60 and extends to a region 68 which represents when a given idler carriage assembly 16 may become disengaged, as best seen in FIG. 4. The surface 70 at the opposing end of the idler carriage assembly frame 50 is preferably flush with the pivot arm 34 when the pivot arm is in an unpivoted state. A stop block 36 may also be welded to the idler carriage assembly frame 50. The stop block 36 may be one and a half inches squared in cross section.

Figure 5A:
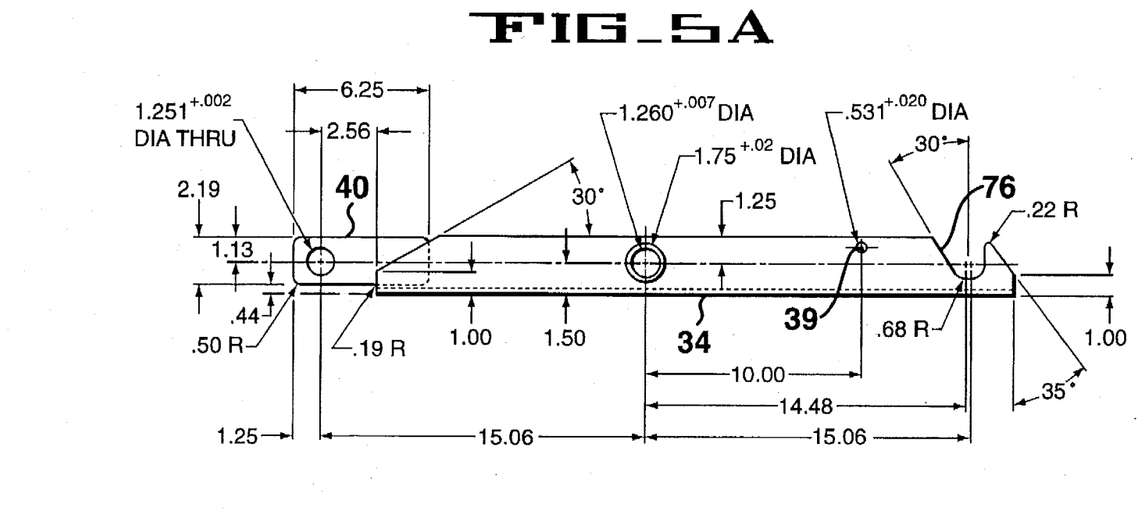
FIG. 5A is a plan view of the pivot arm and bar pin.
Figure 5B:
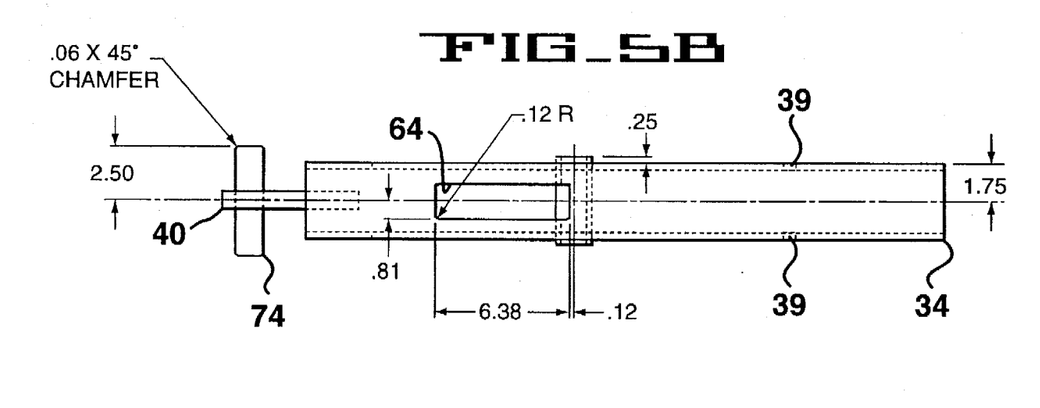
FIG. 5B is an elevation view of the pivot arm, bar pin, and alignment block.
Figure 5C:
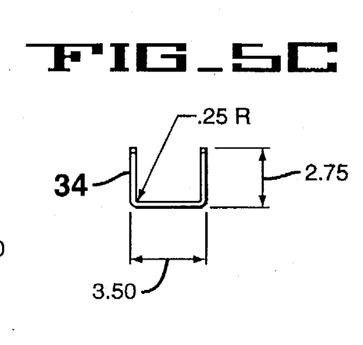
FIG. 5C is a side view of the pivot arm.

Referring also to FIGS. 5A and 5B, a bar pin 40 extends from the pivot arm 34 and is preferably welded to the pivot arm 34. The bar pin 40 houses a pin 74 which may be welded to the bar pin 40. Preferably, the pivot arm 34 is parallel to the surface of the idler carriage assembly frame 50 when the pivot arm is in the unpivoted state. As seen in FIG. 5C, the pivot arm 34 is c-shaped. The pivot arm 34 contains a notch 76 at one end for engaging the pin 74 on an adjacent idler carriage assembly 16. The notch 76 is preferably disposed in a region near the stop block 36 when the pivot arm 34 is in its unpivoted state. The dimensions of the pivot arm 34, bar pin 40, pin 74, and alignment block 64 may be, for example, as shown in FIGS. 5A, 5B, and 5C.

Figure 6:
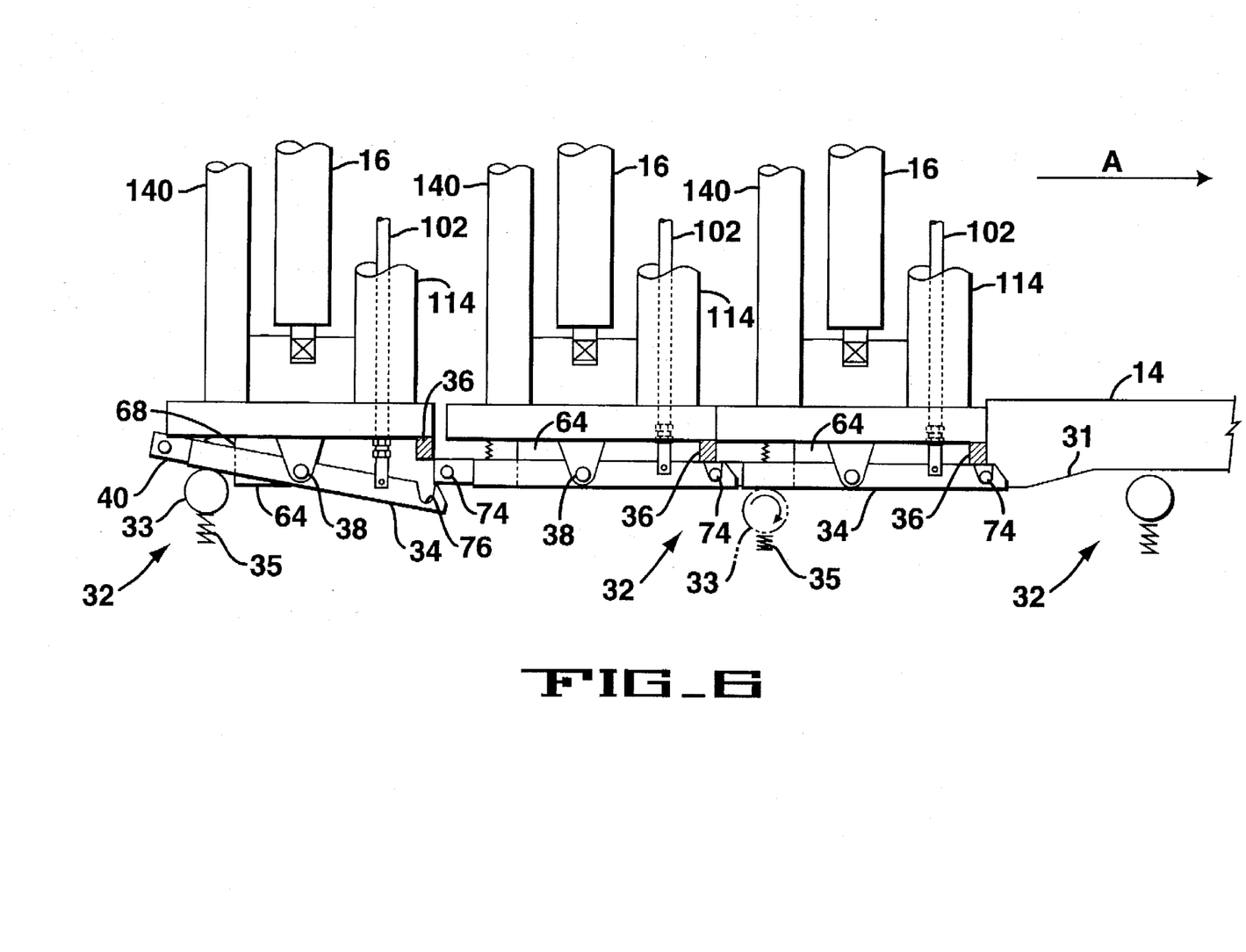
FIG. 6 is a plan view of the cooperation between the idler carriage assembly and a pressure roll assembly in accordance with the principles of the present invention.

Referring to FIG. 6, the pivot arm 34 may become disengaged once the pressure roll assembly 32 reaches region 68 of the alignment block 64. At this point, the pivot arm 34 located on a first idler carriage assembly 16 becomes disengaged from an adjacent idler carriage assembly 16 (or the adjacent pulley carriage assembly 14 if the idler carriage assembly 16 becoming disengaged is the last idler carriage assembly 16 in the belt storage system) because the notch 76 on the pivot arm 34 becomes unhooked from the pin 74 of the adjacent idler carriage assembly 16 (or becomes unhooked from the pin 74 of the adjacent pulley carriage assembly if the idler carriage assembly 16 becoming disengaged is the last idler carriage assembly 16 in the belt storage system 10). The pivot arm 34 may, for example, rotate nine degrees, as shown in FIG. 4.

As stated earlier with regard to FIG. 1, retention of the disengaged idler carriage assembly 16 is accomplished by an arm 37 attached to the side of the pressure roll assembly 32.

The arm 37 extends around the pivot arm 34 to prevent the idler carriage assembly 16 from moving in the direction of the pulley carriage assembly 14. Further, movement in the opposite direction is prevented by a residual compressive force of the pressure roll against the pivot arm 34 as well as the alignment block 64.

Figure 12:
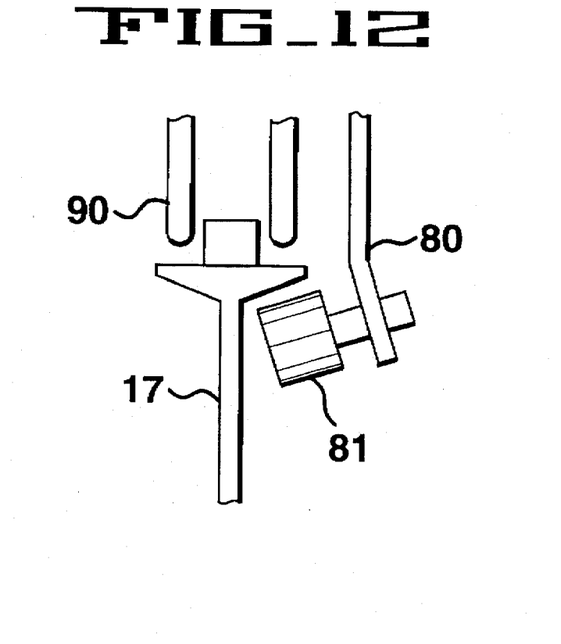
FIG. 12 is an elevation view of the roller and its cooperation with the hold down bracket and track.

Referring back to FIG. 3, a hold down bracket 80 may be disposed near the lower pivot bracket 56 near the center of the idler carriage assembly 16 to help keep the idler carriage assembly 16 from turning over. Referring also to FIG. 12, a roller 81 is connected to the hold down bracket 80 and cooperates with the track 17. The track 17 may be a standard I-beam track and the roller 81 may cooperate with the upper I portion or flange of the I-beam track. Preferably, the lower one-third portion of the hold down bracket 80 is slanted outward at approximately ten degrees to allow the roller 81 to properly cooperate with the upper flange of the I-beam track and thus the hold down bracket 80 should be positioned low enough on the idler carriage assembly 16 so that the roller can wrap under the track I-beam flange. The hold down bracket 80 may be secured to the idler carriage assembly frame 50 via bolts 82 and corresponding nuts, not shown.

Wheels 90 may also be disposed at each end of the idler carriage assembly 16. The wheels 90 may be either v-grooved or double flanged wheels, for example, and ride on the track 17. Further, the wheels 90 may have lube fittings 92 thereon to provide lower friction.

Figure 7:
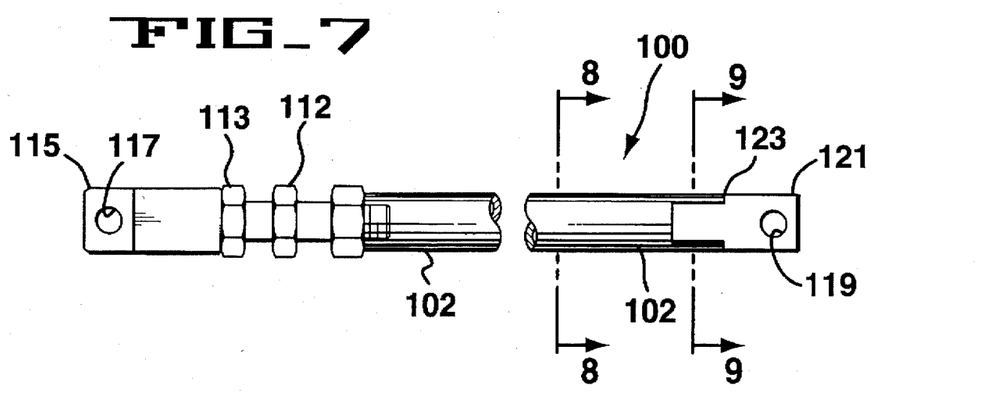
FIG. 7 is an enlarged view of the connection between the tie rod and pivot arm shown in FIG. 4.
Figure 10:
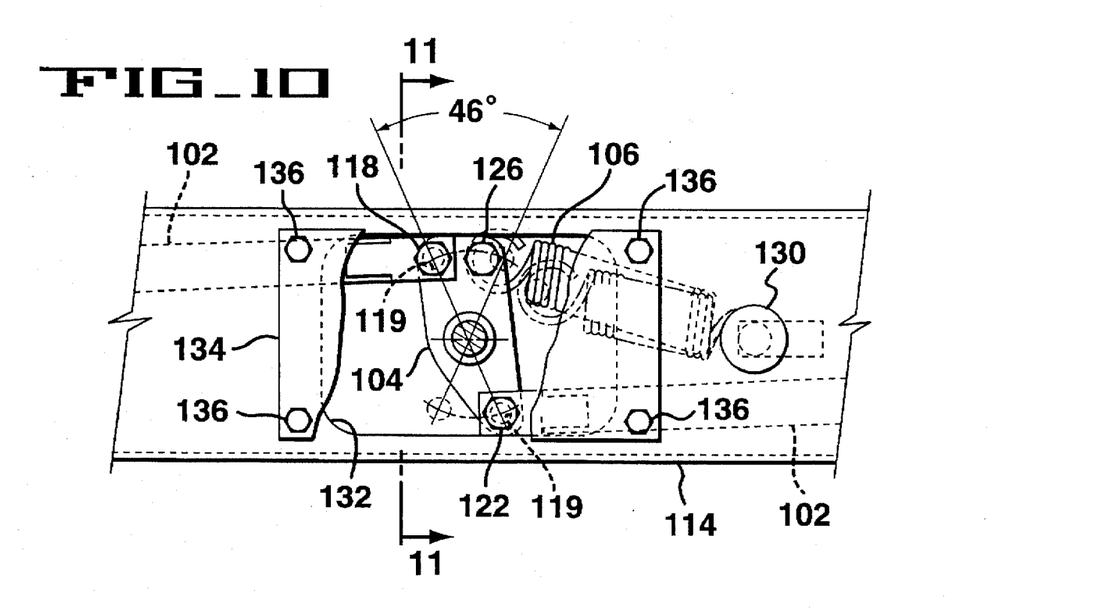
FIG. 10 is a plan view of the central portion of the tie rod.

Referring to FIGS. 4, 7, and 10, there is shown a tie rod 100. The tie rod 100 comprises two link weldments 102, a rocker arm 104 and an extension spring 106. The link weldment 102 may be, for example, approximately forty six inches in length and may be approximately 1 inch in diameter. As seen in FIG. 7, each link weldment 102 is connected to an adjuster weldment 112. The adjuster weldment 112 is, in turn, connected to a hex jam nut 113, which is, in turn, connected to a clevis 115. The clevis 115 contains a bore 117 for receiving a bolt 110 and a nut, not shown, to secure the clevis 115 to the pivot arm 34. As seen from FIGS. 5A and 5B, the tie rod 100 may be attached to the pivot arm 34 at bores 39 ten inches from line 62. The adjuster weldment 112 may be a screw used to adjust the length of the tie rod 100 at each end and may be screwed into each end of the two link weldments 102.

The tie rod 100 may be housed in a tube 114. The tube 114 may be three inches in the vertical direction and five inches in the horizontal direction, may be three-sixteenths of an inch in thickness, and may run the length of the idler carriage assembly 16. The tube 114 may protect the tie rod 100 as well as provide structural support for the idler carriage assembly 16.

Figure 8:
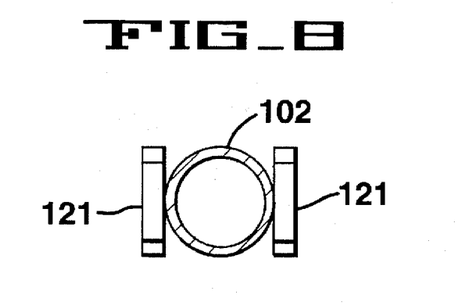
FIG. 8 is a cross section of the tie rod taken along the line 8—8 of FIG. 7.
Figure 9:
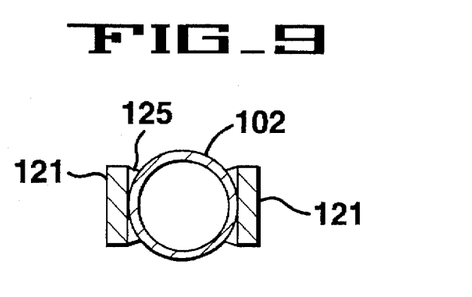
FIG. 9 is a cross section of the tie rod taken along the line 9—9 of FIG. 7.

As seen in FIGS. 7, 8, and 9, the opposing end of the link weldment 102 contains two tabs 121 having a bore 119. The tabs 121 surround the link weldment 102 until the region 123 so that the tabs 121 may properly connect to the rocker arm 104. The tabs 121 may be welded to the link weldment 102 as shown by welding 125

Figure 11:
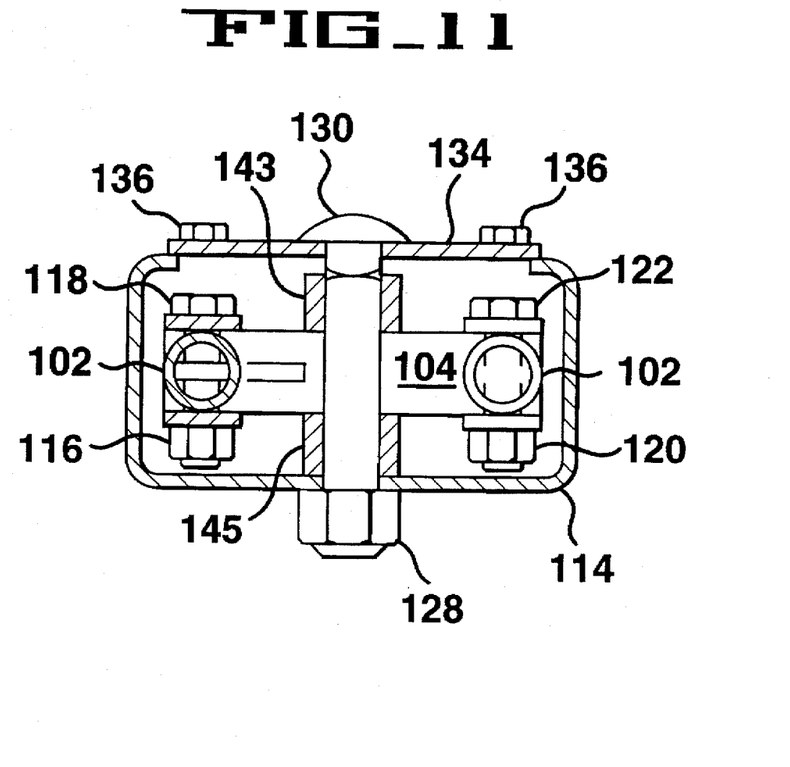
FIG. 11 is a cross sectional view of the tie rod, taken along the lines 11—11 of FIG. 10.

Referring also to FIGS. 10 and 11, the tabs 121 of the first link weldment 102 may be secured to the rocker arm 104 via a bolt 118 and a lock nut 116, the bolt extending through the bore 119. In addition, the tabs 121 of the second link weldment 102 may be secured to the rocker arm 104 via a bolt 122 and a nut 120. Like the first like weldment, the second link weldment contains a bore 119 which receives the bolt 122. The bores 119 may allow for slight adjustment when securing the rocker arm 104 to the link weldments 102 (i.e., the bores are slightly larger in diameter than the blots 118 and 122 to allow some adjustment in the connections between the rocker arm 104 and the link weldments 102). Preferably the link weldments 102 are of the same dimension and the rocker arm 104 is approximately midway between a pair of pivot arms 34 on a given idler carriage assembly 16.

One end of the extension spring 106 is secured to the rocker arm 104 via a bolt 126 and nut, not shown. The opposing end of the extension spring 106 may be secured to the tube 114 via a lock nut 128 carriage bolt 130, the carriage bolt 130 preferably being fastened to opposing faces of the tube 114.

As seen in FIG. 10, the rocker arm 104 is shown in its extended position although the extension spring 106 is shown in both its extended and nonextended positions. The rocker arm 104 may rotate for approximately forty six degrees, for example, as shown in that figure.

A window 132 may be formed in the tube 114 to allow for the insertion and connection of the extension spring 106 to the rocker arm 104 and the link weldments 102 to the rocker arm 104. Referring also to FIG. 11, a plate 134, which is preferably flush with the tube 114 surface, may be placed over the window 132 and secured to the tube 114 via self tap screws 136 after the extension spring 106, rocker arm 104, and link weldments 102 have been properly connected. The plate 134 helps to protect the extension spring 106, rocker arm 104, link weldments 102. Further, spacers 143 and 145 may be used to hold the rocker arm 104 in place relative to the tube 114.

Referring back to FIGS. 4 and 6, in addition to the tube 114, a second supporting structure or arm weldment 140 may be used to support the idler carriage assembly 16. Preferably the arm weldment 140 is a rectangular tube type member which may be three inches in the vertical direction, three inches in the horizontal direction and have a thickness of three-sixteenths of an inch. The arm weldment 140 spans the length of the idler carriage assembly 16.

When the pressure roll assembly 32 passes the alignment block 64 for an idler carriage assembly 16 which is capable of being separated from either an adjacent idler carriage assembly 16 or the pulley carriage assembly 14 (i.e., there is no stop block 36 to prevent the pivoting of the pivot arm 34), the external force applied by the pressure rolls 33 upon the pivot arm 34 is greater than the force of the extension spring 106 which otherwise is used to keep the pivot arms 34 for a given idler carriage assembly 16 in place. When this occurs, the extension spring 106 extends as best seen in FIG. 10. As a result, the pivot arms 34 for the given idler carriage assembly 16 pivot outward, thus disengaging the same from an adjacent idler carriage assembly 16 or adjacent pulley carriage assembly, whichever may be the case. Preferably, the force applied by the pressure roll 33 is approximately 400 lbs and the force applied by the extension spring 106 is approximately 100 lbs. The pressure roll spring 33 may, for example, ramp to 400 lbs, locking the idler carriage assembly 16 in place.

The alignment of the idler carriage assembly 16 when it disengages is preferably performed by employing both a pair of alignment blocks 64 at each end of the idler carriage assembly 16 in conjunction with the use of a tie rod 100 connected to a pair of pivot arms 34 for a given idler carriage assembly. However, the alignment of the idler carriage assembly 16 may be performed by employing just the tie rod 100 without the use of the alignment blocks 64. Further, the alignment may be performed by the use of a single alignment block 64 in conjunction with the use of a tie rod 100. Further, where the activation of a single idler carriage assembly 16 needs to be corrected, an alignment block 64 on just one side of the idler carriage assembly 16 may be employed.

Preferably, the idler carriage assemblies 16 as well as the fixed frame assembly 12, the pulley carriage assembly 14 and the sheave frame assembly are formed of ASTM A36 material steel.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. An idler carriage assembly for use on a belt storage system comprising:

means for aligning said idler carriage assembly when said idler carriage assembly becomes disengaged from a connecting assembly wherein said means for aligning comprises an alignment block disposed on a frame of said idler carriage assembly.

2. An idler carriage assembly for use on a belt storage system comprising:

means for aligning said idler carriage assembly when said idler carriage assembly becomes disengaged from a connecting assembly wherein said means for aligning comprises an alignment block disposed on opposing ends of a frame of said idler carriage assembly.

3. An idler carriage assembly for use on a belt storage system comprising:

means for aligning said idler carriage assembly when said idler carriage assembly becomes disengaged from a connecting assembly wherein said means for aligning comprises a tie rod disposed between two pivot arms, each of said pivot arms being rotatably mounted to opposing ends of a frame of said idler carriage assembly.

4. The invention of claim 1 wherein said means for aligning further comprises a tie rod disposed between two pivot arms, each of said pivot arms being rotatably mounted to opposing ends of said frame.

5. The invention of claim 3 wherein said tie rod comprises a first link weldment, a second link weldment, a spring, and a rocker arm, said link weldments and said spring being connected to said rocker arm, said spring holding said pivot arms in an unpivoted position until an external force is applied which is greater than a force created by said spring.

6. The invention of claim 5 wherein said external force is the force provided by a pressure roll assembly.

7. A belt storage system comprising:

a fixed frame assembly;

a pulley carriage assembly;

at least one idler carriage assembly disposed between said fixed frame assembly and said pulley carriage assembly, said fixed frame assembly, said at least one idler carriage assembly and said pulley carriage assembly disposed on a track, said at least one idler carriage assembly having at least one alignment block disposed thereon;

at least one pressure roll assembly disposed on said track;

wherein said at least one idler carriage assembly becomes disengaged from one of a second idler carriage assembly and said pulley carriage assembly when said at least one pressure roll assembly contacts one end of said at least one alignment block.

8. The invention of claim 7 further comprising a tie rod disposed between two pivot arms, each of said pivot arms being rotatably mounted to opposing ends of a frame of said idler carriage assembly.

9. The invention of claim 8 wherein said tie rod comprises a first link weldment, a second link weldment, a spring, and a rocker arm, said link weldments and said spring being connected to said rocker arm, said spring holding said pivot arms in an unpivoted position until said at least one pressure roll assembly provides a force which is greater than the force created by said spring.

10. An idler carriage assembly for use on a belt storage system comprising:

a stop block mounted to a frame of said idler carriage assembly;

a pivot arm rotatably mounted to said frame, said pivot arm being generally parallel with said frame when said pivot arm is in an unpivoted state, said pivot arm having a notch disposed in a region near said stop block;

an alignment block mounted to said frame, said alignment block being flush with a surface of said pivot arm when said pivot arm is in said unpivoted state;

a bar pin connected to one end of said pivot arm at an end of said pivot arm which is opposing to said region near said stop block;

wherein said pivot arm pivots when a force is applied to one side of said alignment block.

11. The invention of claim 10 wherein said force is a force applied by a pressure roll assembly.

12. The invention of claim 10 further comprising a second pivot arm on an opposing end of said idler carriage assembly frame and a tie rod disposed between said pivot arms.

13. The invention of claim 12 wherein said tie rod comprises a first link weldment, a second link weldment, a spring, and a rocker arm, said link weldments and said spring being connected to said rocker arm, said spring holding said pivot arms in an unpivoted position until said force is applied.

14. The invention of claim 11 wherein said force is the force applied by a pressure roll assembly.

* * * * *